United States Patent Office 3,067,065
Patented Dec. 4, 1962

3,067,065
PROCESS FOR THE SACCHARIFICATION OF CELLULOSE-CONTAINING MATERIAL
Jun Kusama, Tokyo, Japan, assignor to Shin Nippon Chisso Hiryo Kabushiki Kaisha, Osaka, Japan, a corporation of Japan
No Drawing. Filed Jan. 4, 1961, Ser. No. 80,529
10 Claims. (Cl. 127—37)

This invention relates to an improved process for the saccharification of a cellulose-containing material. More particularly, it relates to a saccharification process by the hydrogen-chloride-gas-suspension-method, comprising a step or steps of adding a dry substance with smaller average size than that of the cellulose-containing material. In the process by said method, particles of said material, impregnated with a small amount of hydrochloric acid, are cooled to adsorb hydrogen chloride gas and heated to complete the hydrolysis reaction of cellulose, while said particles are being suspended in hydrogen chloride gas. An object of the present invention is to reduce a strong stickiness of the cellulose-containing particles, resulting from hydrolysis in said suspension process, and thereby to enable a smooth operation of the saccharification process without any trouble. Another object of the present invention is to improve a process of U.S. Patent No. 2,900,284.

U.S. Patent No. 2,900,284 "Process for the Saccharification of Cellulose-Containing Material" is a typical example that employs said suspension saccharification method.

An outline of that patent process is as follows:

(1) A cellulose-containing material, is pre-hydrolyzed with a dilute acid to remove a major part of hemicellulose therefrom,
(2) The pre-hydrolyzed material is washed and dried,
(3) The particles of the dried material are impregnated with such an amount of hydrochloric acid that 45–70 parts of water are contained per 100 parts of the dried material by weight,
(4) The impregnated particles are cooled to a temperature below 75° F. to adsorb hydrogen chloride gas, while being suspended in said gas,
(5) The cooled particles are heated to a temperature above 75° F. to complete the hydrolysis reaction of cellulose also under a condition of suspension in said gas, and
(6) The hydrolyzed particles are heated to a higher temperature for the purpose of acid recovery.

The features of the suspension saccharification method were described also in the specification of said patent, and the summary of them is as follows:

(1) Ease of heat transmission to the particles, which is especially required for the steps of adsorption and acid recovery,
(2) Instantaneous hydrolysis and acid recovery except maturation time shorter than a quarter of an hour,
(3) A simple process of acid recovery in which all of recovered acid and of acid gas can be directly recirculated without any step such as absorption, rectification, or dehydration.

The present invention is improvement of not only said U.S. Patent No. 2,900,284, but also of any other suspension saccharification method. The suspension method may be employed either in case of an unprehydrolyzed material or in case in which a raw material is pre-hydrolyzed with a concentrated acid or only with a high-pressured steam. The saccharification conditions described in said patent need not be employed, and the acid recovery may be performed by means other than a higher temperature, such as vacuum evaporation or washing with water. It has been found in our industrialization test on large scale that the most important problem in the suspension method lies in the stickiness or adhesiveness of the particles resulting from the hydrolysis of cellulose, even in the beginning of the reaction. The present invention solves this problem perfectly. The addition of a dry substance with smaller average size than the cellulose-containing material reduces the stickiness effectively because powder or grains of said substance cover all the particles of said material, adhering to the whole sticky surfaces of them. Many kinds of substances are found to be effective for reducing the stickiness of said particles. The natures required for the stickiness-reducing substance in an industrial use are as follows:

(1) Inertness to, or low reactivity with hydrochloric acid.
(2) Low moisture content.
(3) Freedom from stickiness.
(4) Smaller average size than that of said particles.
(5) Low apparent specific density.
(6) Ease of recovery.
(7) Low cost and ease of obtaining.

Our tests show that following substances are effective for reducing the stickiness of the particles.
They are as follows:

(1) Organic substances:
   (a) Derivatives of plants such as wood, bamboo, straw, bagasse, grass, hay moss, nutshell, chaff, bean, bran, cob, bark, knot, root, resin, humic substance such as compost or decayed plant, sawmill waste, and other agricultural and forestry wastes.
   (b) Derivatives of animal such as bone, hair, feather, wool, hide, meat, fish, etc.
   (c) Organic mineral such as coal, lignite, peat, anthracite, etc.
   (d) Wastes and by-products of industries such as waste synthetic resins, plastics, synthetic fiber lignin, oil cake.
   (e) Wastes from living such as garbage, refuse, dust, rubbish, rag, waste paper, waste package, etc.
   (f) Other organic substances.
(2) Inorganic substances:
   (a) Mineral natural substances such as sand, earth, clay, stone, rock, lava pumice, diatomaceous earth, bentonite, acid clay, kaoline, silica, etc.
   (b) Carbonaceous substances such as graphite, charcoal, coke, carbon black, etc.
   (c) Chemical inorganic substances such as oxides, sulfates, silicates, phosphates, etc. and their complex compounds.
   (d) Wastes and products of industries such as wastes of mine, cinder, ceramics, earthenware, porcelain, china, brick, glass, concrete, cement, rock wool, etc.
   (e) Inorganic wastes such as waste construction materials of building furniture, pavement, refuse, rubbish, garbage, dust, etc.
   (f) Other inorganic substances.
(3) Said substances of (1) and (2) treated with acid or other means.
(4) Any combination of said substances in (1), (2) and (3).

The suitable forms of said substances to be employed as the stickiness-reducer are powders, grains, small fragments, short fibers, small flakes, etc.

The sizes of said substances must be sufficiently smaller than those of the sticky particles, because the principle of stickiness-reduction lies in the adhesion of said substances to the whole surfaces of the sticky particles. The smaller average size of said substance is employed, the less amount is required for the sufficient effect of the stickiness reduction. The size is preferably as large as up to a half of the cellulose-containing material.

Said substances with originally large size, such as wood (except saw dust), bamboo, straw, cob, bark, knot, paper rag, bone, hair, feather, wool, hide coal, lignite, peat, anthracite stone, rock charcoal, coke, rock wool brick, concrete, ceramics, glass, etc. must be converted into small size particles by suitable methods, comprising crushing, cutting, chipping, disintegration, milling, pulverization, etc., and these combinations. Said substances must be dried to remove substantial part of water.

In an industrial use, a cheap and easily obtainable substance should be chosen.

According to our experiments, the relations between the sizes and the necessary amounts of the stickiness-reducing substances are as follows:

(1) IN CASE OF LIGNIN

| | | | | |
|---|---|---|---|---|
| A. Size of particle to be hydrolyzed (mm.) | 0.3 | 0.3 | 0.3 | 0.3 |
| B. Size of lignin particle (mm.) | 0.075 | 0.10 | 0.15 | 0.21 |
| Ratio of B to A (Percent) | 25 | 33 | 50 | 70 |
| Minimum ratio of lignin to material to be hydrolyzed by weight (Percent) | 10 | 14 | 30 | 100 |

(2) IN CASE OF RIVER SAND

| | | | | |
|---|---|---|---|---|
| A. Size of particle to be hydrolyzed (mm.) | 0.3 | 0.3 | 0.3 | 0.3 |
| B. Size of sand particle (mm.) | 0.05 | 0.07 | 0.10 | 0.20 |
| Ratio of B to A (Percent) | 17 | 23 | 33 | 67 |
| Minimum ratio of sand to material to be hydrolyzed by weight (Percent) | 6 | 10 | 50 | 100 |

NOTE.—Sizes of particles A and B are shown in average values.

The amount of the stickiness-reducing substance to be added varies within wide range, but preferably 1–100 parts by weight of the dried substance per 100 parts of the cellulose containing material.

The addition methods of the stickiness-reducing substance to the material particles to be hydrolyzed are as follows:

(1) Adding said substance to the impregnated material, prior to the suspension step,
(2) Adding said substance into the hydrogen chloride gas, prior to the suspension step,
(3) Adding said substance to the early stage of the suspension step,
(4) Adding said substance to a later stage of the suspension step than that of (3),
(5) A combination of (1) and (2),
(6) A combination of (1), (2) and (3),
(7) A combination of (2) and (3),
(8) A combination of (4) and one of (1), (2), (3), (5), (6), (7),
(9) Continuously adding said substance by any method of (1)–(8),
(10) Intermittently adding said substance by any method of (1)–(8).

Available methods for suspending said material in hydrogen chloride gas are as follows:

(1) Fluidization.
(2) Transportation of said material by hydrogen chloride gas flow, as in case of pneumatic conveying of particles.
(3) Dropping said material in hydrogen chloride gas flow as in case of a rotary horizontal vessel such as a rotary kiln in cement manufacturing, etc. and as in case of an apparatus with a device for upward transportation, etc.
(4) Combinations of (1) and (2), (1) and (3), (2) and (3), and (1), (2) and (3).

*Example 1*

The raw material was prepared by treating beech wood chips with dilute acid at a temperature of 130° C. to remove a substantial part of hemicellulose therefrom. The sizes of the pretreated chips were 0.5 mm. on an average, ranging from 1 mm. to 0.1 mm. 10 kg. of the dry pretreated material were added with 35% hydrochloric acid to make water content 6.0 kg. After the completion of uniform impregnation, 1 kg. of dry lignin powder, smaller than 0.1 mm. in size, were added to the impregnated material and uniformly mixed. The mixture was introduced in a reaction column 400 mm. in diameter, into the bottom of which hydrogen chloride gas cooled to —10° C. was sent and made to flow upwards through the column to fluidize the mixture.

After the mixture had been cooled to 5° C., hydrogen chloride gas heated to 60° C. was sent, instead of the cold gas, into the column fluidizing the mixture, the temperature of which was maintained between 40–50° C. till the completion of hydrolysis. Fluidizing was carried out without any difficulty by the effect of the lignin powder and nothing adhered to the inside surfaces of the column. The hydrolysis yield to the theoretical value attained to 95%.

*Example 2*

The same test as Example 1 was repeated except that, instead of pure lignin in Example 1, industrial lignin containing 7% of unsaccharified cellulose was employed. The results were same as in Example 1.

*Example 3*

The same test as Example 1 was carried out. In this case 1 kg. of dry diatomaceous earth smaller than 0.05 mm. in size was employed instead of 1 kg. of lignin powder. The same results were obtained.

*Example 4*

The same test as Example 1 was made except that raw beech wood, not pretreated with dilute acid, was directly hydrolyzed instead of the prehydrolyzed material in Example 1.

*Example 5*

The same test as Example 1 was done except that lignin powder was added to hydrogen chloride gas entering the column instead of the impregnated material in Example 1.

*Example 6*

The raw material was prepared by treating wheat straw with dilute acid at a temperature of 100° C. The straw was cut into 1 mm. in length. The pretreated dry material was continuously impregnated with hydrochloric acid. After completion of uniform impregnation, said material was continuously transported through a long glass tube with a high speed flow of hydrogen chloride gas which had been added by diatomaceous earth before entering said tube. Said material was cooled to 5° C. by cold brine flowing in the outside of said tube.

The cooled material, having left said tube, was separated from the transporting gas flow in a cyclone separator and entered a maturation vessel staying for a while. Said material adsorbed a greater part of necessary amount of hydrogen chloride gas in said tube and all the remaining part of that in said vessel. Then the material was again transported by a high-speed flow of hydrogen chloride gas through another glass tube heated from outside till it attained to a temperature of 45° C. The material, separated from the gas flow, entered again another maturation vessel. Hydrolyses reaction was completed, staying for a while in said vessel, maintained at this temperature. The hydrolyzed product was again transported by a high speed flow of a hot hydrogen chloride gas through a long tube and the impregnated acid and adsorbed gas were recovered from the saccharified product and recirculated directly to the steps of impregnation and adsorption. The sizes of the equipments and the conditions of reaction were described as follows.

| | |
|---|---|
| Feed rate of pretreated material | 10 kg./hr. |
| Moisture of said material | 0.5 kg./hr. |
| Feed rate of hydrochloric acid for impregnation | 12.8 kg./hr. of 35% acid. |
| Feed rate of diatomaceous earth | 0.8 kg./hr. |
| Hydrolyses rate to the theoretical value | 96%. |
| Sugar loss rate to the theoretical value | 5%. |
| Total sugar yield | 91%. |
| Size of the adsorption tube | 18 mm. in diameter and 20 m. in length. |
| Size of the hydrolysis tube | 18 mm. in diameter and 6 m. in length. |
| Size of the recovery tube | 50 mm. in diameter and 20 m. in length. |
| Speed of gas flow through the transportation tube | 30 m./sec. |

The test without adding said diatomaceous earth was tried, but the transportation tubes were soon choked up with sticky reaction product. On the contrary, the addition of said substance enabled to continue a long run test without any difficulty.

*Example 7*

The same tests as Example 6 were repeated except that, instead of pretreated straw, such kinds of raw material were employed as follows:

(1) Wheat straw, not pretreated with acid.
(2) Beech wood, pretreated with acid.
(3) Beech wood, not pretreated with acid.
(4) Saw dust, pretreated with acid.
(5) Saw dust, not pretreated with acid.
(6) Bagasse, pretreated with acid.
(7) Bagasse, not pretreated with acid.
(8) Waste paper, disintegrated into fine, short fibers.
(9) Waste rag, disintegrated into fine short fibers.

All these tests had the same results as Example 6.

*Example 8*

The same tests as Example 7 were repeated except that, instead of diatomaceous earth, such kinds of dry substance, smaller than 0.1 mm. in size, were added as follows:

(1) Pure lignin.
(2) Industrial lignin containing some amount of cellulose.
(3) Coke powder.
(4) Charcoal powder.
(5) Carbon black.
(6) Acid treated peat powder.
(7) Dry clay.
(8) Fine sand.
(9) Brick powder.
(10) Glass powder.

Almost same results as Example 7 were obtained in these tests.

*Example 9*

The same tests as Example 7 were repeated except that stickiness-reducing substance was added in different ways such as follows:

(1) Added to the impregnated material,
(2) Added to the hydrogen chloride gas before entering the adsorption tube. (Though this is the same way that was employed in Examples 6, 7, and 8, it was repeated to compare with other tests.)
(3) A combination way of (1) and (2).
(4) Besides (1), (2) or (3), further added to the hydrogen chloride gas before entering the hydrolysis tube.

All these tests were similarly effective for stickiness reduction.

*Example 10*

Three rotary, horizontal vessels were employed for hydrolysis of saw dust pretreated with acid. The vessels had six shelves to elevate and drop the material particles into hydrogen chloride gas flowing through them in counter-current against the advance of the material 20 kg. per hour of pretreated, dry saw dust were impregnated with 25 kg. of 35% hydrochloric acid per hour in a continuous impregnator. The impregnated material and 2 kg. per hour, of dry clay powder, smaller than 0.05 mm. in size, were fed into the adsorption rotary vessel, where the material particles, coated with the clay powder immediately after their entrance, were cooled to adsorb hydrogen chloride gas while falling down from a shelf, elevated by the rotation of the vessel into hydrogen chloride gas flow at a temperature of −10° C.

The material, having left the adsorption vessel, was introduced to the second vessel or completion of hydrolysis. 1 kg. per hour, of fresh clay powder was again supplied together with said material to this second vessel, where the material was heated to 40° C.–50° C. and maintained at this range of temperature for a while by hot hydrogen chloride gas flow to complete hydrolysis reaction.

The saccarified product, having left the second vessel, was introduced to the third vessel, where the product was heated by hydrogen chloride gas flow at high temperature and both the impregnated acid and the adsorbed gas were recovered. Clay powder was not added to the third vessel.

The sizes of the vessels were as follows:

| No. of vessel | Diameter (m.) | Length (m.) |
|---|---|---|
| 1 | 0.5 | 2 |
| 2 | 0.5 | 1.5 |
| 3 | 0.6 | 3 |

The hydrolysis rate to the theoretical value was 95% in the second vessel and the sugar loss in the 3rd vessel was 7% to the total sugar. Troubles caused by adhesion of the material were encountered only in rare cases in the long run test.

*Example 11*

The same tests as Example 10 were repeated except that, instead of dry clay powder, such kinds of dry substance, smaller than 0.1 mm. in size, were added as follows:

(1) Coal cinder powder.
(2) Brick powder.
(3) Mixture of pumice powder and lignin.
(4) Mixture of diatomaceous earth and lignin.
(5) Acid-treated rock powder.

The similar results were obtained in these tests.

What I claim is:

1. In the process of saccharification of a cellulose-containing material by the hydrogen-chloride-gas-suspension-method, the improvement of contacting particles of the cellulose-containing material, having a sticky surface, with a dry substance the particles of which are of smaller average size than half the average particle size of the cellulose-containing material, the particles of said dry substance being substantially inert to hydrochloric acid, and free from stickiness.

2. The improvement described in claim 1 wherein the dry substance is lignin.

3. The improvement described in claim 1 wherein the dry substance is diatomaceous earth.

4. The improvement described in claim 1 wherein the dry substance is a mixture containing lignin.

5. The improvement described in claim 1 wherein the dry substance is added to hydrogen chloride gas prior to the introduction of particles of cellulose-containing material thereinto.

6. The improvement described in claim 1 wherein the dry substance is added to cellulose-containing material which has been previously impregnated with dilute saccharifying acid.

7. The improvement described in claim 1, wherein said dry substance is suspended in the hydrogen gas flow carrying the particles of cellulose-containing material.

8. The improvement described in claim 1, wherein said dry substance is admixed with the particles of cellulose-containing material and the resulting mixture is then fluidized in hydrogen chloride gas.

9. The improvement described in claim 1, wherein the particles of said dry substance are caused to drop into a zone of hydrogen chloride gas, thereby suspending said dry substance particles therein, and contacted with particles of said cellulose-containing material.

10. The improvement described in claim 1, wherein said dry substance is added in amounts sufficient to coat the particles of said cellulose-containing material.

References Cited in the file of this patent
UNITED STATES PATENTS

| | | |
|---|---|---|
| 2,739,086 | Wallace et al. | Mar. 20, 1956 |
| 2,900,284 | Motoyoshi et al. | Aug. 18, 1959 |